Figure 2:
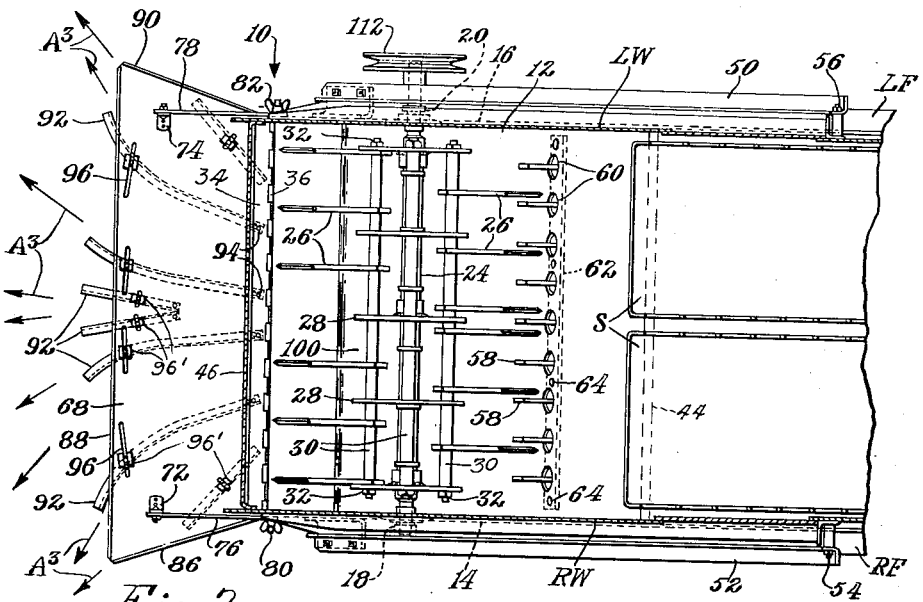

May 17, 1955

D. L. ADAMS 2,708,582

STRAW CHOPPER AND SPREADER ATTACHMENT FOR COMBINES

Filed Feb. 11, 1952

INVENTOR.
D. L. Adams
BY
C. T. Parker & J. M. Kurtz
Attorneys

United States Patent Office 2,708,582
Patented May 17, 1955

2,708,582

STRAW CHOPPER AND SPREADER ATTACHMENT FOR COMBINES

Donald L. Adams, Moline, Ill., assignor to Deere & Company, Moline, Ill., a corporation of Illinois Application February 11, 1952, Serial No. 271,044

3 Claims. (Cl. 275—3)

This invention relates to a straw-chopper attachment for a combine and more particularly to improved means for chopping and distributing the straw that is separated from the grain in the threshing operation.

An attachment of the general character referred to finds its greatest utility in a mobile, combined harvesting and threshing machine—commonly called a "combine"—for the purpose of distributing behind the machine the straw that is separated from the grain during the threshing operation. One of the primary purposes behind the chopping and spreading of straw is to facilitate the subsequent plowing operation, since the straw, if left uncut and in windrows behind the machine, presents a not inconsiderable obstacle to plowing. The chopping and spreading or distributing procedure is followed in cases in which it is not desirable to pick up and bale or stack the straw.

Straw-chopping attachments in general are not new, and many U. S. patents have been issued on various forms of devices intended to do, in general, the job for which the straw-chopping attachment forming the subject matter of the present invention was designed. Nevertheless, the present design includes several improvements over attachments that have gone before, particularly as respects the efficient distribution of the straw after it has been cut or chopped.

The conventional combine has at its rear end (or it may have at one side or the other) a hood defining a straw outlet from which the straw is discharged by the conventional straw walkers of the separating mechanism. Normally, the straw would drop directly to the ground and would lie there in windrows parallel to the travel of the machine. There are known in the art distributors of the type rotatable on a vertical axis for merely distributing the straw without a previous chopping or cutting operation. There are also known those types of attachments in which the straw is preliminarily chopped by some form of rotor rotatable on a horizontal axis and serving not only to reduce the straw but to throw it rearwardly and outwardly for deposit on the ground. Straw choppers of this type are normally used with various forms of deflector means for spreading the straw in a thin layer and over relatively wide areas on the ground.

The fundamental object of the present invention is to provide an improved straw-chopping attachment which has distributing means including a baffle means providing an undersurface against which the discharged straw is directed so that this straw impinges on the undersurface as it is discharged from the rotor chamber or housing. In the accomplishment of this object, the undersurface of the baffle means has a plurality of distributor vanes depending therefrom and diverging generally in the direction of straw discharge so as to spread the rather thick layer of straw from the rotor housing into a relatively thin and wide layer. There is still further involved in the accomplishment of this object means for varying the path of the straw as it leaves the attachment so that variations can be had in the angle at which the straw impinges against the baffle means. The last named means is in the form of a deflector which acts on the layer of straw leaving the rotor chamber in such manner as to deflect this layer either upwardly or downwardly. The baffle means is also vertically adjustable so that a combination of adjustments of the baffle means and the deflector means is available to suit the type of ultimate discharge desired.

Another object of the invention is to provide a straw-chopper attachment that is of such construction that it may be inexpensively built and sold for ready attachment to combines of existing designs.

And another object, particularly in respect of the baffle means having the straw-directing undersurface with depending vanes, is to eliminate clogging of the nature that occurs in prior art baffles or deflectors having vaned upper surfaces.

Figure 1:
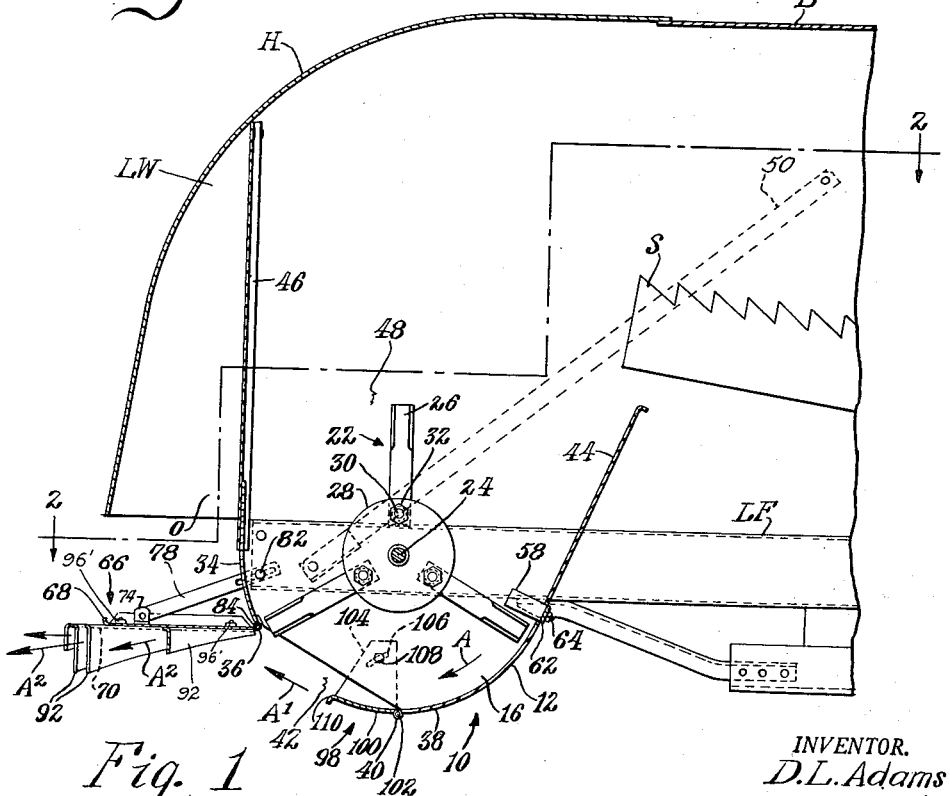

The foregoing and other important objects inherent in and encompassed by the invention will become apparent from the following disclosure of a preferred embodiment of the invention as illustrated in the accompanying sheet of drawings in which:

Figure 1 is a longitudinal sectional view through the rear portion of a combine body, which section is transverse to the axis of the rotor in the chopper attachment; and Figure 2 is a sectional view as seen substantially along the line 2—2 of Figure 1.

The combine body is designated generally by the letter B and has a rearwardly and downwardly curving hood H provided with right- and left-hand side walls RW and LW and having an open bottom O through which straw is discharged by gravity as it leaves conventional straw walkers S. In the normal operation of the combine, the straw discharged from the straw walkers S through the bottom O of the hood H would drop directly to the ground to form a windrow behind the machine.

According to the present invention, there is provided an improved straw-chopper attachment designated generally by the numeral 10 and including supporting structure by means of which the entire attachment may be readily attached to or detached from a conventional combine, such as that illustrated. The supporting structure for the attachment includes a rotor housing 12 having opposite end portions in the form of right- and left-hand end walls 14 and 16 in which are respectively carried bearings 18 and 20 coaxial on a horizontal axis. These bearings journal a chopping rotor 22 of the type having a central shaft 24 and a plurality of radiating chopper arms 26 spaced apart lengthwise or axially of the shaft 24. In the particular design illustrated, the shaft 24 has fixed thereto at axially spaced points thereon a plurality of hub members 28 through which are passed three arm-supporting rods 30. In the present case, the arms are equally spaced about the axis of the shaft 24. The arms are preferably fixed to their respective rods 30 and the rods have their opposite ends threaded to receive securing nuts 32 whereby the arms are substantially fixed relative to the rotor hub 28, but the arms may yield circumferentially in the event that they encounter an obstacle in the chopping operation.

The housing 12 further includes an elongated generally upright rear wall 34 which, when the attachment is in place, is transversely across the rear of the combine body B just below the opening O of the hood H. As illustrated, the wall 34 is preferably curved and comprises a section of a cylinder about the axis of the rotor shaft 24. This wall has a lower terminal or marginal edge 36 disposed at a level below that of the rotor shaft 24. The housing further includes a bottom wall 38, which is preferably also curved to form a section of a cylinder about the rotor shaft 24. This wall has a rear terminal edge 40 substantially directly below the axis of the rotor shaft 24. The two terminal edges 36 and 40 are spaced apart circumferentially as respects the rotor to define a rear discharge opening 42 in that quadrant of the rotor housing 12 below the horizontal diameter of the rotor and to that side (here the rear side) of the vertical diameter of the rotor toward the upright wall 34. Stated otherwise, the quadrant referred to is below a horizontal plane through the rotor axis and to the rear of a vertical plane through the rotor axis. The bottom wall 38 extends circumferentially and then upwardly to provide a forwardly and upwardly inclining front wall 44 which forms a chute directly under the discharge ends of the straw walkers S. The rear wall 34 has an upright extension 46 which fits up inside the hood H and the straw from the straw walkers S is discharged into a top inlet opening 48 defined by the wall portions 44 and 46. The wall 46 of course prevents the straw from being thrown too far rearwardly and thus prevents the discharge of straw except into the rotor housing 12.

The rotor housing defines a rotor chamber within which the rotor rotates in the direction of the arrow A (Figure 1), in which direction the rotor sweeps the straw downwardly and circumferentially over the wall 38 to pass outwardly and rearwardly through the discharge opening 42 as indicated at A¹. To the extent thus far described, the discharge of the straw will be in the form of a relatively vertically thick layer the width of which will be substantially coextensive with the length of the rotor. This layer will move generally horizontally and approximately tangent to the bottom wall 38 as it moves over the bottom-wall terminal edge 40 and beneath the terminal edge 36 of the wall 34.

The basic structure of the combine may include right- and left-hand side sills RF and LF to which the end walls 14 and 16 of the rotor housing 12 may be respectively attached. The rotor housing may be additionally braced by downwardly and rearwardly extending side braces 50 and 52. These braces are removably attached to the sides of the combine, as at 54 and 56, all of which is consistent with the idea of providing the straw chapper as an attachment without materially altering the basic combine design.

As previously stated, the chopper arms 26 are spaced axially of the rotor and have sharpened leading edges for the chopping of straw received from the combine straw walkers S. As illustrated, the trailing edges of the chopper arms are also sharpened, which is an expedient permitting reversal of the arms so that the trailing edge may be used as the leading edge when the original leading edge becomes dull. In order that the chopper may function as efficiently as possible, there is provided means for cooperation with the chopper arms 26 in the reduction or chopping of straw. In the present case, this means take the form of a plurality of chopper bars or fingers 58 spaced apart generally along a line parallel to the rotor axis so as to interfit in the spaces between neighboring pairs of chopper arms 26. The interfitting may be varied to individual desires. The arrangement shown is merely representative of many forms that could be resorted to. A feature of the present invention is the installation of the chopper fingers 58. The wall portion substantially at the junction of the curved bottom wall 38 and the upwardly and forwardly inclining wall extension 44 is provided with a plurality of apertures 60. These are spaced apart on the order of the spaces between the chopper arms so as to enable the installation and removal of the chopper fingers 58 from outside the rotor housing 12. The chopper fingers are fixed to a transverse support or bar 62 which is removably secured, as by a plurality of nut and bolt assemblies 64, to the external surface of the wall portion on which the assembly is supported. Thus, the chopper fingers 58 project inwardly into the rotor chamber and beyond the inner surface of the wall 38—44 past which the chopper arms 26 sweep as the rotor rotates. In the event of damage to any of the chopper fingers, the entire assembly 58—62 may be removed without interfering in any way with the interior of the rotor chamber. It is also possible, of course, to remove and reverse the assembly end for end for reinstallation thereof with the opposite edges of the fingers 58 cooperating with the rotor knives 26.

Another feature of the invention is the provision of baffle means, designated generally by the numeral 66. In its present form, this means comprises preferably a sheet metal plate 68 having an undersurface 70 which adjoins the terminal edge 36 of the rear wall 34 and which extends generally horizontally outwardly or rearwardly from this edge. The top surface of the plate 68 is provided with selectively adjustable means including right- and left-hand brackets in the form of angles 72 and 74 to which are respectively connected upwardly and forwardly inclining adjusting braces 76 and 78. These have slotted upper ends that are respectively adjustably secured to the rotor housing end walls 14 and 16 by any suitable means, such as wing nuts 80 and 82. The plate 68 is adjustably associated with the rear wall 34 by means of a hinge 84 having its axis substantially coincident with the terminal edge 36.

The plate 68 may have its marginal edges turned up for rigidity, as at 86, 88 and 90.

Depending from the undersurface 70 of the plate 68 is a plurality of deflector vanes 92. Each vane of the central group is pivoted at its rotor-proximate end on a vertical axis at 94 to the plate 68 so that the free or outer ends thereof are capable of being adjusted laterally. Suitable slots and clamping members 96—96' represent one form of selectively releasable means that may be utilized to secure the vanes in any position of adjustment, the slots 96 being in the plate and the clamping members 96' including vane-attached bolts and nuts. The outermost vanes may retain fixed positions as illustrated. If desired, the two central vanes may also be fixed; although, adjustability for all of the vanes is suggested.

The positions of the vanes are such that they diverge rearwardly or in the direction of discharge of the layer of straw from the rotor housing through the side or rear discharge opening 42. Thus, as the layer of straw impinges against the undersurface 70 of the plate 68, the vanes cause the layer to be thinned out and distributed laterally at opposite sides so that the straw will cover a relatively wide area of the ground behind the combine. Adjustability of the baffle means 66 by virtue of the hinge at 84 and the adjusting braces 76 and 78 enables the operator to select the distance that the straw will be spread behind the combine. Adjustment of the vanes relative to the plate 68 will govern the width or transverse dimension of the area of the discharged straw.

A still further feature of the invention resides in the provision of adjustable deflector means, designated generally by the numeral 98. This deflector means preferably takes the form of a plate 100 hinged along one edge at 102 to the terminal edge 40 of the bottom wall 38. The arcuate length of the plate 100 is relatively short so that it extends only part way across the bottom opening 42 substantially as a circumferential continuation of the housing bottom wall 38. The plate 100 may have each of its sides turned up, as indicated at 104 in Figure 1, and each turned-up portion may have an arcuate slot 106 cooperative with a securing bolt 108, whereby the deflector means 98 may be adjusted relative to the bottom wall 38. The adjusting means just described is merely representative of many forms that could be used.

Since the deflector means 98 is adjustable about the transverse hinge at 102, the angle thereof relative to the general angle of the bottom wall 38 may be varied. The marginal or rear edge of the plate 100, designated by the numeral 110, may thus be moved upwardly relative to the undersurface 70 of the baffle plate 68 and consequently the angle of the discharged layer of straw may be adjusted. In the position shown, the deflector means 98 will cause the straw to be deflected upwardly slightly from the horizontal, but still approximately at a tangent to the circumference of the rotor. The upwardly and rearwardly directed layer of straw will impinge against the undersurface 70 of the baffle plate 68, following generally the direction indicated by the arrow $A^1$. The straw will then leave the undersurface 70 of the baffle plate 68 in the general direction indicated by the arrows $A^2$ in Figure 1 and by the arrows $A^3$ in Figure 2. Various combinations of adjustments of the baffle means 66 and deflector means 98 may be utilized to secure the type of distribution desired.

Rotation of the rotor 22 in the direction of the arrow A may be accomplished in any suitable manner, as by means of a sheave 112 keyed to the left-hand end of the rotor shaft 24, which sheave may be connected by a belt (not shown) to an available output member on the combine.

The several features of the invention have been outlined above in connection with the description of the preferred embodiment thereof. Various other features not specifically enumerated will undoubtedly occur to those versed in the art, as likewise will numerous modifications and alterations in the preferred design illustrated, all of which may be achieved without departing from the spirit and scope of the invention.

What is claimed is:

1. A straw chopper attachment for a combine, comprising: a rotor; supporting structure including a housing journaling the rotor on a horizontal axis, said housing having a top inlet opening for the feeding of straw to the rotor and a generally upright rear wall and a bottom wall angularly related about the rotor, the rear wall having a bottom terminal edge and the bottom wall having a rear terminal edge, said edges generally paralleling the rotor axis and being spaced apart circumferentially as respects the rotor to define a rear discharge opening in that quadrant of the housing below and to the rear of the rotor axis; means for effecting rotation of the rotor in such direction that peripheral portions of said rotor move downwardly from the inlet opening to sweep straw circumferentially rearwardly over the bottom wall for discharge through the discharge opening substantially as a generally horizontal layer approximately tangent to the bottom wall at the rear terminal edge thereof; and baffle means carried by the supporting structure above the discharge opening and outside the housing and including a generally horizontal undersurface adjoining and extending rearwardly from the bottom edge of the rear wall to closely overlie the discharge layer, said baffle means including a plurality of distributor vanes depending from the undersurface thereof and running generally fore-and-aft and diverging rearwardly to spread the layer transversely of its original path.

2. A straw chopper attachment for a combine, comprising: a rotor; supporting structure including a housing journaling the rotor on a horizontal axis, said housing having a top inlet opening for the feeding of straw to the rotor and a generally upright rear wall and a bottom wall angularly related about the rotor, the rear wall having a bottom terminal edge and the bottom wall having a rear terminal edge, said edges generally paralleling the rotor axis and being spaced apart circumferentially as respects the rotor to define a rear discharge opening in that quadrant of the housing below and rearwardly of the rotor axis; means for effecting rotation of the rotor in such direction that peripheral portions of said rotor move downwardly from the inlet opening to sweep straw circumferentially rearwardly over the bottom wall for discharge through the discharge opening substantially as a generally horizontal layer approximately tangent to the bottom wall at the rear terminal edge thereof; baffle means carried by the supporting structure above the discharge opening and outside the housing and including a generally horizontal undersurface adjoining the bottom edge of and extending rearwardly from the rear wall to closely overlie the discharged layer, said baffle means including a plurality of distributor vanes depending from the undersurface thereof and running generally fore-and-aft and diverging rearwardly to spread the layer transversely of its original path; and deflector means adjustably carried by the supporting structure and lying along and extending rearwardly from the rear terminal edge of the bottom wall as a circumferentially rearward extension of the bottom wall for selectively deflecting the layer of straw upwardly to impinge in varying degrees against the undersurface and vanes of the baffle means.

3. The invention defined in claim 2, in which: the baffle means is mounted on the upright wall for vertical adjustability relative to said upright wall, and selectively adjustable means is connected between the baffle means and said upright wall for varying the position of the baffle means relative to the deflector means.

References Cited in the file of this patent

UNITED STATES PATENTS

| | | |
|---|---|---|
| 339,454 | McWhorter | Apr. 6, 1886 |
| 639,437 | Robinson | Dec. 19, 1899 |
| 657,419 | Jager | Sept. 4, 1900 |
| 949,173 | Ellis | Feb. 15, 1910 |
| 1,644,575 | Fitzgerald | Oct. 4, 1927 |
| 2,172,886 | Gabel | Sept. 12, 1939 |
| 2,213,906 | Ebersol | Sept. 3, 1940 |
| 2,281,846 | Klein | May 5, 1942 |
| 2,327,893 | Hobson | Aug. 24, 1943 |
| 2,430,020 | Johnson | Nov. 4, 1947 |
| 2,476,465 | Tarrant | July 19, 1949 |
| 2,502,032 | Watson | Mar. 28, 1950 |
| 2,554,669 | Elofson | May 29, 1951 |